Dec. 28, 1937.   R. ABRAHAMSOHN ET AL   2,103,606
MULTIRANGE INDICATING INSTRUMENT
Filed July 16, 1936   2 Sheets-Sheet 1
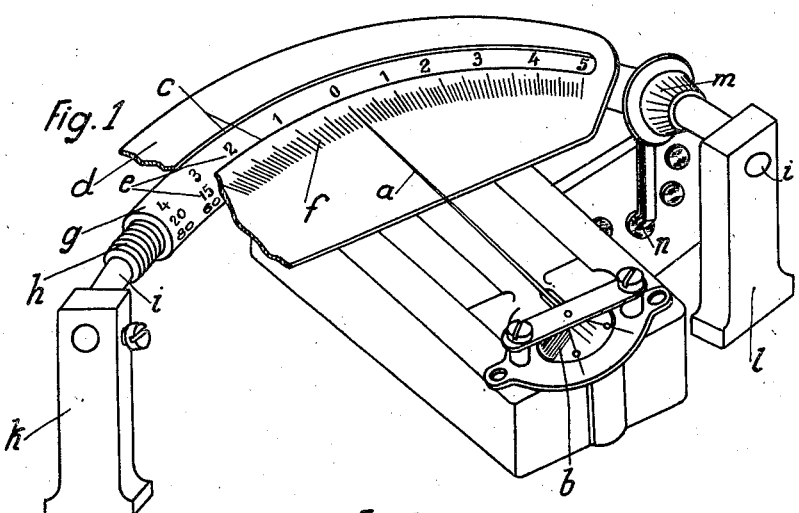
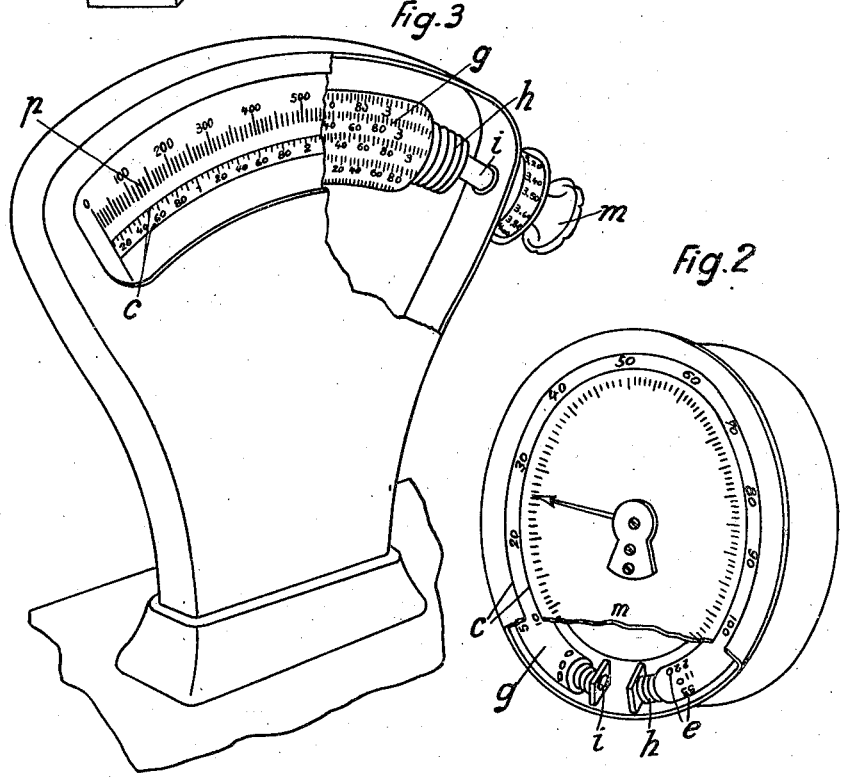
Inventors:
R. Abrahamsohn & E. Abrahamsohn
By Glascock Downing & Seebold Dec. 28, 1937. R. ABRAHAMSOHN ET AL 2,103,606
MULTIRANGE INDICATING INSTRUMENT
Filed July 16, 1936   2 Sheets—Sheet 2
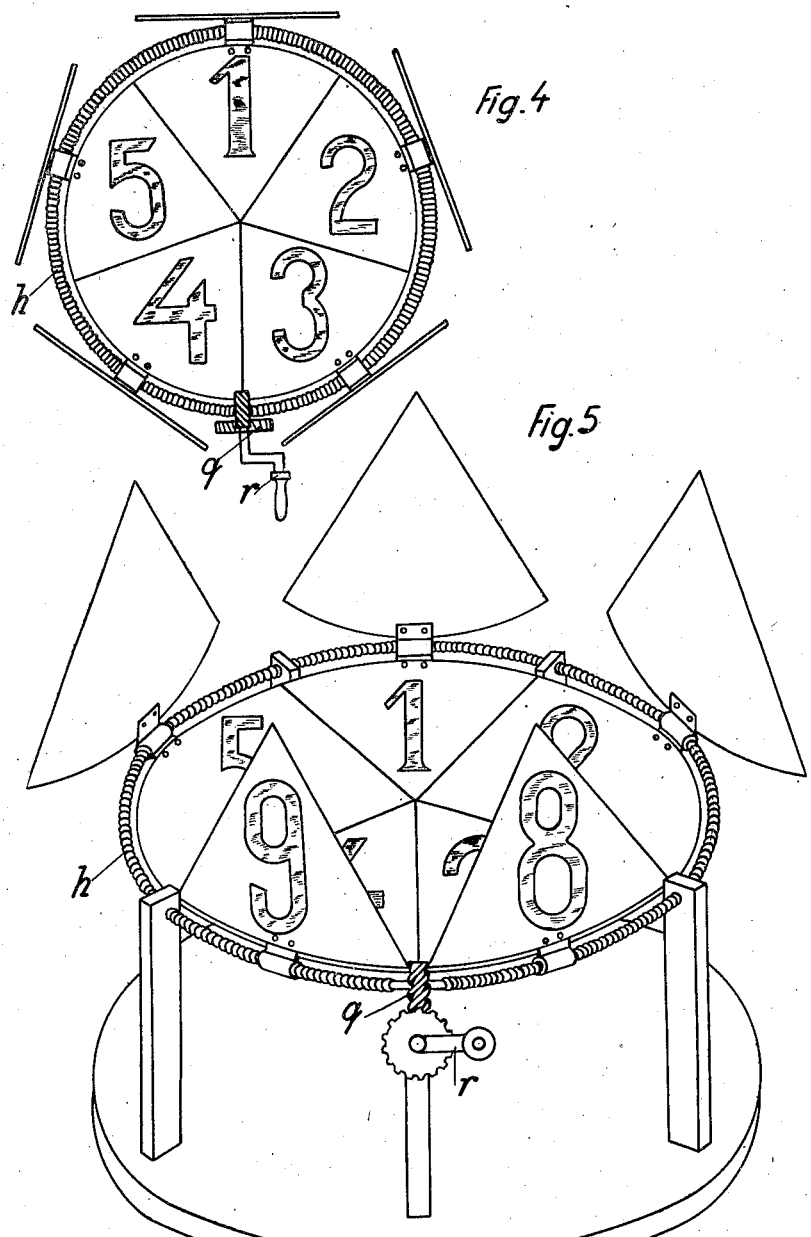

Patented Dec. 28, 1937

2,103,606

UNITED STATES PATENT OFFICE 2,103,606

MULTIRANGE INDICATING INSTRUMENT

Robert Abrahamsohn and Edmund Abrahamsohn, Berlin-Steglitz, Germany

Application July 16, 1936, Serial No. 90,987
In Germany September 6, 1935

9 Claims. (Cl. 171—95)

This invention relates to a multiple scale for measuring and indicating instruments with curved scale carriers. The range of applicability of such multiple scales extends to measuring instruments actuated by an electrical, mechanical or other means, tachometers, weighing apparatus, tuning appliances for radio apparatus, clocks, meters, thermometers, signalling, controlling and advertising devices, and also measuring and indicating devices of any kind in which it is necessary or desirable to render the indicated values visible on one or more different scale graduations selectively, or to exchange one scale for another scale of different characteristics.

So far as the idea of the multiple scale has hitherto been used, the expedient has been adopted of printing the various individual scales upon an endless band, and moving this band past a reading slot, below the pointer of a measuring instrument for example. Such a band can, however, only be employed in instruments of which the pointers move over a small angle. Attempts have also already been made to extend multiple scales to a greater angle of deflection by providing, at definite places on the scale, at the tens marks, in place of stationary numerals, numeral wheels which are fed forward stepwise, and multiply the values of the basic scale.

Now the present invention relates to a changeable multiple scale, the carrier of which can be bent to any desired curve, for instance to circular arcs extending round an angle of 360°. This scale carrier is constructed, according to the invention, as a flexible hollow body, which is rotatably arranged upon a stationary axis, curved to correspond to the form of the scale.

The said hollow body is preferably constructed as a seamless corrugated metal tube, as a tube of textile fabric or other resilient material, or as a wire spiral, to the periphery of which the scale markings are applied either directly or indirectly, that is to say, either directly upon the surface of the flexible body, or else upon a tube slipped over this hollow body, or else on separate discs or labels, which are secured to the flexible hollow body. This flexible hollow body is preferably so constructed as to resist axial torsional stresses, so that it can be rotated throughout the entire length of the scale without slipping and without angular displacement.

It is also possible to arrange the scale selector between two stationary scales having different characteristics, and to distinguish the associated numbers and scales by a difference in color. It is also possible to apply to the scale selector in part numerals and markings, and also scale graduations.

Various forms of construction of the invention are illustrated by way of example in the accompanying drawings, in which Fig. 1 shows in perspective an electrical measuring instrument with a multiple scale constructed according to the present invention;

Fig. 2 shows in perspective a mechanical measuring instrument, namely a tachometer, with a multiple scale according to the invention;

Fig. 3 shows a weighing machine with an adjustable scale of prices opposite to a stationary scale of weights;

Figs. 4 and 5 show in plan and in perspective respectively a further form of the invention, as applied to a signalling or advertising device.

In Fig. 1 the pointer $a$ of a measuring instrument $b$ moves in front of a window $c$ in a dial plate $d$. In the window $c$ there appear the numbers on a multiple scale $e$, wherein the basic subdivisions $f$ may be provided, as shown, for purposes of convenience, upon the dial plate $d$, or else may be provided between the numbers on the multiple scale $e$.

The individual scales of the multiple scale are provided upon the periphery of a rotatably arranged flexible hollow body $h$, which may be constructed as a seamless corrugated metal tube, a fabric tube, or a tube of any other resilient material, or even as a wire spiral or the like. In the example illustrated, the scales are applied, on the grounds of convenience, not directly to the periphery of this hollow body $h$ but to the periphery of a tube or sleeve $g$ formed of any flexible or resilient material such as india-rubber, which is drawn over the tube $h$. This tube $h$ is itself rotatably mounted upon a curved stationary support $i$, which is carried by two blocks $k$ and $l$.

The tube $h$ is rotated about the axial support $i$, for the purpose of changing one individual scale for another, by means of a rotary knob $m$, which may advantageously be connected with a switch $n$, for switching on the various ranges of measurement corresponding to the different scales.

In the tachometer illustrated in Fig. 2 the corrugated tube $h$, with the india-rubber sleeve $g$ mounted thereon, extends round an arc of almost 360°. The changing of the individual rows of numerals constituting the various scales may be effected either by hand, or else automatically, in dependence upon the selected speed ratio.

Of the weighing machine illustrated in Fig. 3 only the upper part is shown. In this figure, $p$ is a stationary scale of weights, and underneath the scale $p$ there is a window aperture $c$, through which a scale of prices can be seen. The scale of prices is constructed as a multiple scale $g$, which is supported upon a stationary support $i$. The control lever by which the individual scales of the multiple scale are brought to the window aperture is preferably provided with an index, which denotes in any convenient manner either the goods to which the individual scale relates, or the price at which such goods are to be sold.

The flexible hollow body $h$, or the flexible tube or sleeve $g$ slipped over it, need not be round, as shown in the constructonal examples illustrated, but may be prismatic in shape, so that the inscriptions lie upon plane surfaces and not upon curved surfaces.

In the examples so far described, the scale graduation is applied directly to the periphery of the sleeve on the curved hollow body.

A further feature of the invention comprises instruments in which the markings constituting the scale occupy the whole or the greater part of the plane of the scale. There are, for instance, clocks in which the numerals from 1 to 12 are periodically exchanged for the numerals from 13 to 24. Such clocks, which are mainly used for public buildings, railway stations and so forth, are intended to be easily seen from a considerable distance, and this is only possible if the numbers are as large as possible. With the clocks of this nature hitherto known, the numbers are only about half as large as they might be, if no substitution of the numbers is effected.

With the present invention the numbers can be changed without thereby restricting the size of the latter. These advantages apply not only to clocks, but also to signalling, controlling or advertising devices, in which the signs occupying the whole or the greater part of the surface of the scale have to be exchanged for others. This device may be used in instruments with plane scales, as well as with instruments with curved scales, and it is available for any angle of deflection up to 360°. A device of this nature is illustrated in Figures 4 and 5.

If in Fig. 5 the metal tube or sleeve $h$ is rotated by means of a drive $q$, $r$ to such an extent that the flags bearing the numerals 1, 2, 3, 4, 5 lie in one plane, they combine with one another to form a complete scale image, as shown in Fig. 4. If the rotation of the metal sleeve is continued by rotating the crank $r$ the individual parts of the scale move like the petals of an opening flower. They rise out of their common plane, and thereby leave room for the next group of plates bearing the numerals 6, 7, 8, 9 and 10, these plates being secured to the same metal tube and being arranged at an angle to the previous series of plates. The plates of the second series also combine to form a fresh scale, as soon as they lie in a common plane. Upon further rotation of the crank $r$ the same series of operations is repeated. If the individual plates of the groups constituting the various scales form angles of 90° with one another, there is always only visible in the field of vision the particular scale of which the individual parts are located in one plane.

What we claim is:—

1. A multiple scale unit for multiple scale indicating instruments, comprising a stationary curved axial support, and a flexible tubular multiple scale carrier rotatable about the curved axis of the support, the multiple scales being borne by the said scale carrier.

2. A multiple scale unit for multiple scale indicating instruments, comprising a stationary curved axial support, and a flexible multiple scale carrier in the form of a seamless corrugated tube of metal rotatable about the curved axis of the support, the multiple scales being borne by the said scale carrier.

3. A multiple scale unit for multiple scale indicating instruments, comprising a stationary curved axial support, and a flexible multiple scale carrier in the form of a tube of resilient fabric rotatable about the curved axis of the support, the multiple scales being borne by the said scale carrier.

4. A multiple scale unit for multiple scale indicating instruments, comprising a stationary curved axial support, and a flexible multiple scale carrier in the form of a wire spiral rotatable about the curved axis of the support, the multiple scales being borne by the said scale carrier.

5. A multiple scale unit for multiple scale measuring and indicating instruments, comprising a stationary curved axial support, a flexible tubular scale carrier, rotatable about the curved axis of the support, and a tube of resilient material slipped over the scale carrier, the multiple scales being marked on the said tube of resilient material.

6. A scale unit for indicating devices, comprising a stationary curved axial support, a flexible tubular multiple scale carrier rotatable about the curved axis of the support, and indicating elements borne by the said scale carrier.

7. A multiple scale unit for multiple scale indicating instruments, comprising a flexible tubular scale carrier rotatable about a curved axis, the multiple scales being borne by the said scale carrier.

8. An indicator structure of the type disclosed comprising a pointer and an arcuate supporting member, a resilient scale carrier sleeved upon said support and rotatable thereon, there being a plurality of scales associated with said carrier adapted to be selectively disposed in association with the pointer upon rotation of said carrier to change characteristics or range of the indicator.

9. An indicator structure of the type disclosed comprising a pointer and a bowed supporting member, a resilient scale carrier sleeved upon said support and rotatable thereon, there being a plurality of scales associated with said carrier adapted to be selectively disposed in association with the pointer upon rotation of said carrier to change characteristics or range of the indicator, and means operable coincidentally with rotation of said carrier for changing the response of the pointer.

ROBERT ABRAHAMSOHN.
EDMUND ABRAHAMSOHN.